United States Patent
Kono et al.

(10) Patent No.: US 10,917,287 B2
(45) Date of Patent: Feb. 9, 2021

(54) RECORDING MEDIUM RECORDING COMMUNICATION CONTROL PROGRAM, COMMUNICATION CONTROL APPARATUS, AND COMMUNICATION CONTROL METHOD

(71) Applicant: FUJITSU LIMITED, Kawasaki (JP)

(72) Inventors: Taki Kono, Kodaira (JP); Akira Kato, Yachiyo (JP); Kosei Takano, Fujimino (JP); Machiko Kawamura, Kawasaki (JP); Yukio Sato, Ota (JP); Kanami Hitsuda, Yokohama (JP); Teruaki Nakayama, Setagaya (JP); Hiroki Nikai, Ota (JP)

(73) Assignee: FUJITSU LIMITED, Kawasaki (JP)

( * ) Notice: Subject to any disclaimer, the term of this patent is extended or adjusted under 35 U.S.C. 154(b) by 28 days.

(21) Appl. No.: 16/367,322

(22) Filed: Mar. 28, 2019

(65) Prior Publication Data
US 2019/0222472 A1     Jul. 18, 2019

Related U.S. Application Data

(63) Continuation of application No. PCT/JP2016/079131, filed on Sep. 30, 2016.

(51) Int. Cl.
*H04L 12/24*     (2006.01)
*G06F 16/22*     (2019.01)
(Continued)

(52) U.S. Cl.
CPC .......... *H04L 41/0668* (2013.01); *G06F 16/22* (2019.01); *H04L 43/0811* (2013.01);
(Continued)

(58) Field of Classification Search
CPC ... H04L 41/0668; H04L 43/0811; G06F 16/22
See application file for complete search history.

(56) References Cited

U.S. PATENT DOCUMENTS

| 2002/0186167 | A1* | 12/2002 | Anderson | G01S 5/02 342/465 |
| 2003/0043736 | A1* | 3/2003 | Gonda | H04L 45/28 370/218 |

(Continued)

FOREIGN PATENT DOCUMENTS

| JP | 2000-175250 A | 6/2000 |
| JP | 2005-210634 A | 8/2005 |

(Continued)

OTHER PUBLICATIONS

JPOA—Office Action of Japanese Patent Application No. 2018-541852 dated Mar. 3, 2020 with Full Machine Translation.

(Continued)

*Primary Examiner* — Jael M Ulysse
(74) *Attorney, Agent, or Firm* — Fujitsu Patent Center

(57) ABSTRACT

A non-transitory computer-readable recording medium having stored therein a communication control program for causing a computer to execute a process includes: receiving, from each of a plurality of base stations, communication result between the respective base stations and a communication terminal; storing, when the received communication result indicates that transmission of a message from a first base station to a specific communication terminal is failed, the message in a storage in association with identification information on the specific communication terminal; and referring, when the received communication results indicates that communication is established between a second base station and the specific communication terminal, to the storage, transmitting the message stored in association with the identification information on the specific communication (Continued)

terminal to the second base station, and requesting the second base station to transmit the message to the specific communication terminal.

12 Claims, 8 Drawing Sheets

(51) Int. Cl.
*H04L 12/26* (2006.01)
*H04W 16/28* (2009.01)
*H04W 88/08* (2009.01)
*H04W 88/06* (2009.01)

(52) U.S. Cl.
CPC ............ *H04W 16/28* (2013.01); *H04W 88/06* (2013.01); *H04W 88/08* (2013.01)

(56) References Cited

U.S. PATENT DOCUMENTS

| | | | | |
|---|---|---|---|---|
| 2006/0104230 A1* | 5/2006 | Gidwani | ............... | H04W 84/00 370/328 |
| 2006/0258357 A1* | 11/2006 | Bi | ..................... | H04W 36/0055 455/437 |
| 2008/0102841 A1* | 5/2008 | Kato | ..................... | H04W 36/02 455/442 |
| 2008/0293404 A1* | 11/2008 | Scherzer | ............... | H04W 72/00 455/426.1 |
| 2013/0028235 A1* | 1/2013 | Barrett | .................. | H04W 60/04 370/331 |
| 2013/0059587 A1* | 3/2013 | Lindoff | ............. | H04W 36/0058 455/436 |
| 2013/0195078 A1* | 8/2013 | Kobayashi | .......... | H04W 36/165 370/331 |
| 2013/0301617 A1* | 11/2013 | Kuhn | ................ | H04W 36/0083 370/331 |
| 2014/0126388 A1* | 5/2014 | Shin | ..................... | H04W 48/20 370/252 |
| 2014/0140277 A1* | 5/2014 | Barrett | .................... | H04W 8/08 370/328 |
| 2014/0153390 A1* | 6/2014 | Ishii | ..................... | H04W 52/383 370/230 |
| 2014/0153489 A1* | 6/2014 | Perras | ................... | H04W 60/00 370/328 |
| 2014/0204728 A1* | 7/2014 | Kobayashi | ............ | H04L 45/122 370/218 |
| 2014/0269251 A1* | 9/2014 | Zhou | ..................... | H04W 24/04 370/216 |
| 2014/0378136 A1* | 12/2014 | Park | .................... | H04L 41/0668 455/436 |
| 2015/0140999 A1* | 5/2015 | Zhang | ................... | H04W 76/15 455/424 |
| 2015/0208286 A1* | 7/2015 | Ozturk | ............. | H04W 36/0022 370/331 |
| 2015/0208295 A1* | 7/2015 | da Silva | ............. | H04L 41/0668 370/221 |
| 2015/0319774 A1* | 11/2015 | Cai | .................... | H04W 36/0072 370/329 |
| 2016/0212680 A1* | 7/2016 | Talukdar | ............... | H04W 40/34 |
| 2016/0219475 A1* | 7/2016 | Kim | ..................... | H04W 76/27 |
| 2016/0262163 A1* | 9/2016 | Gonzalez Garrido | ...................... | H04W 16/10 |
| 2016/0381577 A1 | 12/2016 | Kono | | |
| 2017/0078895 A1* | 3/2017 | Sriram | .................. | H04W 24/10 |

FOREIGN PATENT DOCUMENTS

| | | |
|---|---|---|
| JP | 2008-118227 A | 5/2008 |
| JP | 2011-160122 A | 8/2011 |
| JP | 2013-038652 A | 2/2013 |
| WO | 2015/151219 A1 | 10/2015 |

OTHER PUBLICATIONS

International Search Report and Written Opinion of the International Searching Authority (Form PCT/ISA/210, 220, and 237), mailed in connection with PCT/JP2016/079131 and dated Dec. 27, 2016 (14 pages).

* cited by examiner

FIG. 3

| MESSAGE ID | TRANSFER SPEED (bps) | FREQUENCY (MHz) | BASE STATION ID | TRANSMISSION DATE AND TIME | SHIP ID | COMMUNICATION STATUS | ... |
|---|---|---|---|---|---|---|---|
| A01 | 125 | 27 | A | 2015.01.29 21:11:00 | 001A | 4, 5, 2015.01.29 21:11:15, (x1,y1) | |
| A02 | 100 | 20 | B | 2015.01.29 21:11:00 | 002A | 3, 4, 2015.01.29 21:11:23, (x2,y2) | |
| ... | | | | | | | |

FIG. 4

| HEADER SECTION | | | DATA SECTION (CONTENT OF MESSAGE) |
|---|---|---|---|
| MESSAGE ID | MESSAGE TYPE | MESSAGE LENGTH | |

FIG. 5

| MESSAGE ID \ SHIP ID | 001A | 002A | 003A | ... |
|---|---|---|---|---|
| A01 | NOT COMPLETED | | | |
| A02 | | | UNDER REQUEST | |
| ... | | | | |

*FIG. 9*

| MESSAGE ID \ SHIP ID | 001A | 002A | 003A | ... |
|---|---|---|---|---|
| A01 | NOT COMPLETED (PRIORITY: MEDIUM) | | | |
| A02 | | | UNDER REQUEST | |
| A03 | NOT COMPLETED (PRIORITY: HIGH) | | | |
| ... | | | | |

RECORDING MEDIUM RECORDING COMMUNICATION CONTROL PROGRAM, COMMUNICATION CONTROL APPARATUS, AND COMMUNICATION CONTROL METHOD

CROSS-REFERENCE TO RELATED APPLICATION

This application is a continuation application of International Application PCT/JP2016/079131 filed on Sep. 30, 2016 and designated the U.S., the entire contents of which are incorporated herein by reference.

FIELD

The embodiments discussed herein are related to a communication control program, a communication control apparatus, and a communication control method.

BACKGROUND

There is a technology for performing communication between a base station disposed at each of a plurality of principal localities defined in advance and a communication terminal present at an arbitrary location.

Japanese Laid-open Patent Publication No. 2000-175250 and International Publication Pamphlet No. WO 2015/151219 are disclosed as related art.

SUMMARY

According to an aspect of the embodiments, a non-transitory computer-readable recording medium having stored therein a communication control program for causing a computer to execute a process includes: receiving, from each of a plurality of base stations, communication result between the respective base stations and a communication terminal; storing, when the received communication result indicates that transmission of a message from a first base station to a specific communication terminal is failed, the message in a storage in association with identification Information on the specific communication terminal; and referring, when the received communication results Indicates that communication is established between a second base station and the specific communication terminal, to the storage, transmitting the message stored in association with the identification information on the specific communication terminal to the second base station, and requesting the second base station to transmit the message to the specific communication terminal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating an example of a communication record table;

FIG. 4 is a diagram illustrating an example of a data format of a message;

FIG. 5 is a diagram illustrating an example of a transmission management table;

FIG. 9 is a diagram illustrating another example of the transmission management table.

DESCRIPTION OF EMBODIMENTS

Figure 1:
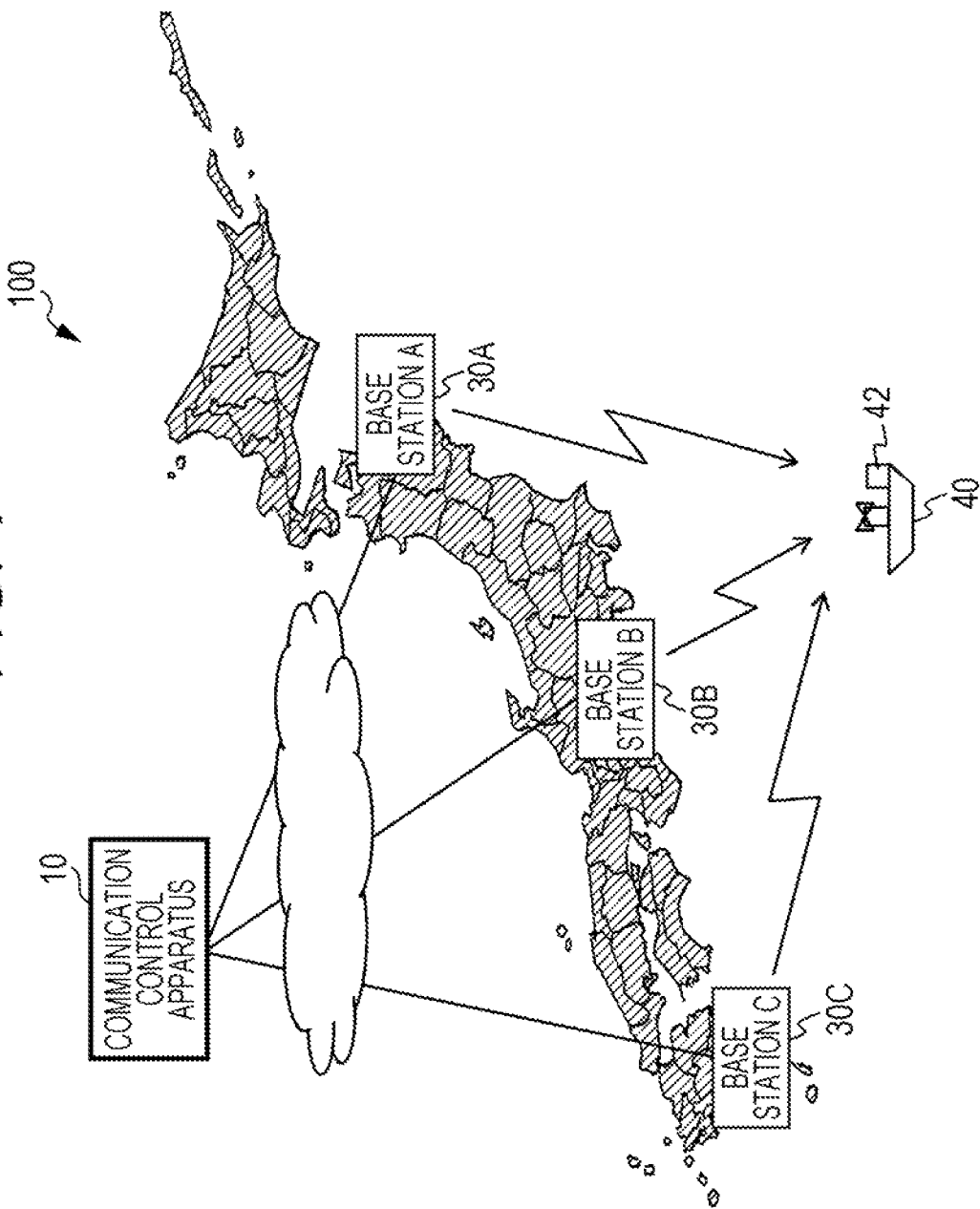
FIG. 1 is a diagram for explaining an outline of a communication system according to an embodiment of the present Invention.

For example, in a system, a radio base station that has received an information provision command transmitted from a radio terminal possessed by a user transmits the information provision command to a server and the server generates response information corresponding to the information provision command to transmit to a plurality of base stations. In this system, the user's most neighboring base station immediately transmits the response information to the user's radio terminal, while the other base stations expected that the user approaches later hold the response Information until the user approaches and, when the approach of the user is detected, transmit the response information.

For example, when performing communication between a plurality of base stations and a communication terminal carried on a mobile body, communication between a ship and a base station disposed in a coastal area or the like is performed. In a case where reliable communication between the ship and the base station is desired, it is conceivable to use satellite communication or the like, while a communication system using satellite communication is expensive. Accordingly, in order to perform communication over a long distance at low cost, communication utilizing the reflection of radio waves of a shortwave band frequency at the ionosphere is used for communication between the ship and the base station.

For example, as an example of the technology using the shortwave band frequency, an information processing system including a mobile terminal, a plurality of base stations, and an information processing apparatus is proposed. In this system, the information processing apparatus generates information to be transmitted to the mobile terminal and transmits the information to the plurality of base stations. Upon receiving the information, the base station generates a radio signal of a shortwave frequency band corresponding to the information and transmits the generated radio signal to the mobile terminal. Upon receiving the radio signal from one of the base stations, the mobile terminal acquires the information from the received radio signal.

In a communication technique utilizing the ionospheric reflection, communication is sometimes disabled because an area that radio waves reach changes and radio waves pass through the ionosphere depending on the condition of the ionosphere. In this case, a situation occurs in which communication between the base station and the communication terminal carried on the mobile body is disabled. Accordingly, it is conceivable to cause a plurality of base stations to hold the response information to be transmitted to the communication terminal; however, communication is not always established reliably between the base station holding the response information and the communication terminal carried on the mobile body. In addition, in the related art using the shortwave band frequency, a situation in which communication is disabled between the base station and the communication terminal is not considered.

For example, a technology capable of improving the reliability of information transmission to a communication terminal may be provided.

Hereinafter, an example of embodiments according to the disclosed technology will be described in detail with reference to the drawings.

As Illustrated in FIG. 1, a communication system 100 according to an embodiment includes a communication control apparatus 10, base stations 30A, 30B, and 30C, and a communication terminal 40 carried on a ship 42, which is a mobile body. In the following description, when the base stations 30A, 30B, and 30C are explained without any distinction, these base stations are simply referred to as "base stations 30". FIG. 1 illustrates an example in which three base stations 30 and one communication terminal 40 are included in the communication system 100, but the number of base stations 30 and communication terminals 40 is not limited to the example in FIG. 1.

The communication control apparatus 10 is an information processing apparatus such as a server or a personal computer provided on a cloud such as a data center. The base station 30 is an information processing apparatus having a communication function disposed in a facility of a fishery association or the like provided, for example, in a coastal area. The base station 30 and the communication control apparatus 10 are mutually connected via a network such as the Internet. Radio communication utilizing reflection of radio waves of a shortwave band frequency (about 3 to 30 MHz) in the ionosphere is performed between the base station 30 and the communication terminal 40.

In the communication utilizing the ionospheric reflection, communication is sometimes disabled because an area that radio waves reach changes and radio waves pass through the ionosphere depending on the condition of the Ionosphere. For this reason, the communication between the base station 30 and the communication terminal 40 is not always successful reliably every time. Accordingly, when transmitting the message to the communication terminal 40, the base station 30 properly modifies communication conditions including the frequency used for transmission of the message and the transfer speed of the message and then transmits the message.

For example, when the communication terminal 40 receives the message transmitted from the base station 30, the communication terminal 40 sends an acknowledgment (ACK) to the base station 30 as a reply.

The base station 30 transmits a communication condition inquiry to the communication control apparatus 10 when the ACK is not received from the communication terminal 40, which is the transmission destination of the message, within a predetermined time. The communication condition inquiry includes identification information on the communication terminal 40, which is the transmission destination of the message, a base station ID which is identification information on the base station 30 (local device), and information on scheduled transmission time of the message (for example, the current time). In the present embodiment, a ship ID which is identification Information on the ship 42 carrying the communication terminal 40 is used as the identification information on the communication terminal 40. When the communication conditions (details will be described later) determined on the basis of a communication record by the communication control apparatus 10 are sent as a reply in response to the communication condition inquiry, the base station 30 receives the sent communication conditions and resends the message to the communication terminal 40 on the basis of the received communication conditions.

The base station 30 can select communication conditions matching the communication conditions transmitted from the communication control apparatus 10 or similar communication conditions from among a plurality of types of communication conditions according to an appliance of this base station 30. In this manner, by determining the communication conditions on the basis of the communication record, the communication conditions when the communication was successful in the past can be used and the probability that the transmission of the message will be successful increases. In addition, repeating the transmission of the message while properly modifying the communication conditions improves the reliability that the transmission of the message is completed.

Furthermore, when requested for proxy transmission of the message by the communication control apparatus 10, the base station 30 transmits the requested message to the designated communication terminal 40. Although the details will be described later, the proxy transmission of the message means to transmit the message whose transmission from another base station 30 to the communication terminal 40 has failed, on behalf of the another base station 30.

The base station 30 transmits a communication result indicating whether the transmission of the message to the communication terminal 40 was successful or failed to the communication control apparatus 10. As described above, the transmission of the message from the base station 30 includes the transmission of the message to be transmitted originally from the local device to the communication terminal 40 and the transmission of the message by proxy transmission. Accordingly, in order to clarify the distinction between the communication result for the transmission of the message to be transmitted originally from the local device to the communication terminal 40 and the communication result for the transmission of the message by proxy transmission, the former is referred to as "communication result of the local device" and the latter is referred to as "communication result of proxy transmission". For example, the communication result transmitted from the base station 30 includes the communication result of the local device indicating that the transmission of the message was successful, the communication result of the local device indicating that the transmission of the message failed, the communication result of proxy transmission indicating that the transmission of the message was successful, and the communication result of proxy transmission indicating that the transmission of the message failed.

The communication result of the local device indicating that the transmission of the message was successful includes, for example, a remark indicating that this data is the communication result of the local device, a message ID, the communication conditions (transfer speed and frequency) at the time of transmitting the message, the base station ID, transmission date and time of the message, the ship ID, and a communication status. Examples of the communication status may include the reception strength at the time of receiving the ACK at the base station 30, and information included in the ACK transmitted from the communication terminal 40. The ACK includes, for example, information such as the reception strength at the time of receiving the message at the communication terminal 40, reception date and time, the position of the ship 42 at the time of receiving the message. As for the position of the ship 42, position information measured by a positioning system such as a global positioning system (GPS) carried on the ship 42 can be used. In the present embodiment, it is assumed that the position Information on the ship carrying the communication terminal 40 is identical to the position information on the communication terminal 40.

Meanwhile, the communication result of the local device indicating that the transmission of the message failed includes a remark indicating that this data is the communication result of the local device, the message ID of the message to be transmitted, the ship ID of the ship 42 carrying the communication terminal 40, which is the transmission destination of the message, and the message to be transmitted.

The communication result of proxy transmission indicating that the transmission of the message was successful includes a remark indicating that this data is the communication result of proxy transmission, the message ID of the message transmitted by proxy, and the ship ID of the ship 42 carrying the communication terminal 40, which is the transmission destination of the message. The communication result of proxy transmission indicating that the transmission of the message was successful includes, as in the communication result of the local device indicating that the transmission of the message was successful, the communication conditions (transfer speed and frequency) at the time of transmitting the message, the base station ID, transmission date and time of the message, the communication status, and the like.

The communication result of proxy transmission indicating that the transmission of the message failed includes a remark indicating that this data is the communication result of proxy transmission, the message ID of the message that failed in proxy transmission, and the ship ID of the ship 42 carrying the communication terminal 40 to which the transmission of the message failed.

Figure 2:
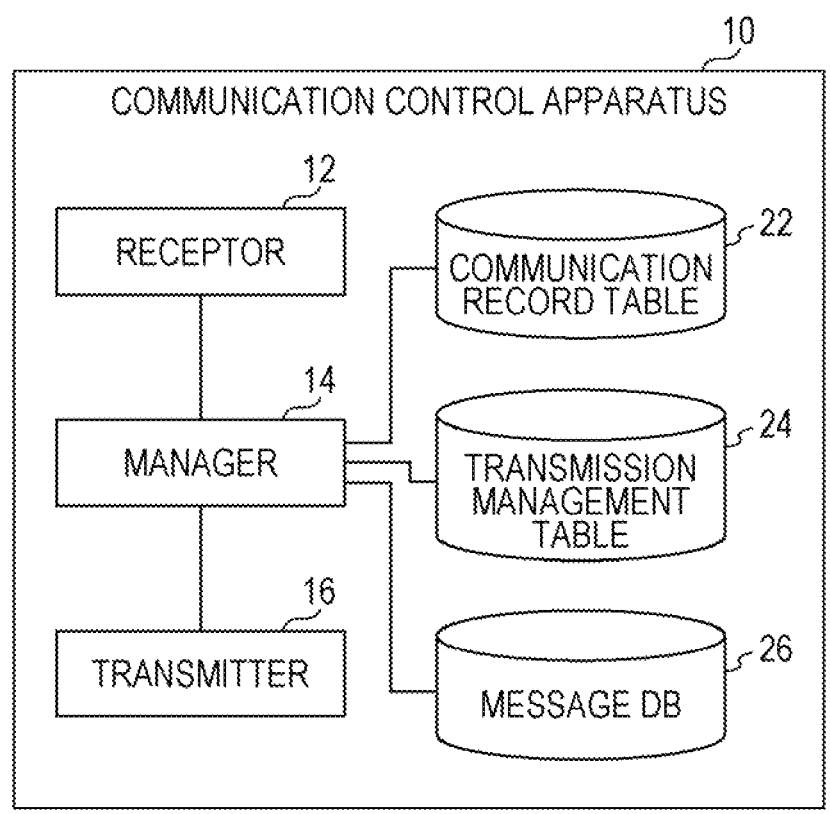
FIG. 2 is a functional block diagram of a communication control apparatus according to the present embodiment.

As Illustrated in FIG. 2, the communication control apparatus 10 functionally includes a receptor 12, a manager 14, and a transmitter 16. A predetermined storage area of the communication control apparatus 10 stores a communication record table 22, a transmission management table 24, and a message database (DB) 26. Note that the manager 14 and the transmitter 16 are examples of a manager of the disclosed technology.

The receptor 12 receives the communication condition inquiry and the communication result transmitted from each of the base stations 30. The receptor 12 delivers the received communication condition inquiry and communication result to the manager 14.

When the communication result of the local device indicating that the transmission of the message was successful is delivered from the receptor 12, the manager 14 stores each piece of information included in the delivered communication result in association with each item of the communication record table 22.

Here, FIG. 3 illustrates an example of the communication record table 22. In the example in FIG. 3, each record (each row) corresponds to the communication record for one instance of transmission of a message. Each communication record includes items such as "message ID", the communication conditions ("transfer speed" and "frequency"), "base station ID" of the transmission source, "transmission date and time", "ship ID" of the transmission destination, and "communication status". FIG. 3 illustrates an example in which the reception strength of the ACK at the base station 30, the reception strength of the message at the communication terminal 40, the reception date and time, and the reception position are stored in order as "communication status".

When the communication result of the local device indicating that the transmission of the message failed is delivered from the receptor 12, the manager 14 stores the message included in the communication result in the message DB 26 and also stores the contents of the communication result in the transmission management table 24.

Here, FIG. 4 illustrates an example of a data format of the message. In the example in FIG. 4, the message includes a header section containing the message ID, a message type, and a message length (data size of the message), and a data section indicating the content of the message. The message type represents a type according to the content of the message, such as a regular report, urgent communication, weather information, or an alarm.

The transmission management table 24 is a table for managing the message whose transmission failed and the transmission destination of this message in association with each other. FIG. 5 illustrates an example of the transmission management table 24. FIG. 5 illustrates an example of the transmission management table 24 in a matrix format in which each row represents the message ID and each column represents the ship ID. In this example, a flag indicating that the transmission of the message is not completed (referred to as "not completed" in the example in FIG. 5) is set in a row of the message ID indicating a message whose transmission to the communication terminal 40 carried on the ship 42 indicated by the ship ID in each column is not completed. When the flag is not set, the corresponding cell remains blank. For a message for which proxy transmission is being requested, a flag indicating that proxy transmission is being requested ("under request" in the example in FIG. 5) is set in the corresponding cell.

For example, when the communication result of the local device indicating that the transmission of the message failed is delivered from the receptor 12, the manager 14 adds a row of the message ID included in the communication result and a column of the ship ID included in the communication result to the transmission management table 24. Then, the manager 14 sets the flag "not completed" in the corresponding cell.

When the communication result of the local device indicating that the transmission of the message was successful is delivered from the receptor 12, in addition to the above process of storing the communication result in the communication record table 22, the manager 14 requests the base station 30 that has transmitted the delivered communication result to transmit the message that has not been completed, by proxy. For example, the manager 14 refers to the transmission management table 24 and specifies the message ID for which the flag "not completed" is set in correspondence to the ship ID included in the communication result. The manager 14 acquires the message corresponding to the specified message ID from the message DB 26. Then, the manager 14 delivers, to the transmitter 16, a proxy transmission request including the acquired message, and a request to transmit the corresponding message to the communication terminal 40 carried on the ship 42 indicated by the ship ID included in the communication result. After delivering the proxy transmission request to the transmitter 16, the manager 14 modifies the flag of the corresponding cell in the transmission management table 24 from "not completed" to "under request".

When the communication result of proxy transmission indicating that the transmission of the message was successful is delivered from the receptor 12, the manager 14 stores information included in the communication result in the communication record table 22. In addition, on the basis of the ship ID and the message ID included in the communication result, the manager 14 cancels the setting of the flag "under request" of the corresponding cell in the transmission management table 24 (makes the corresponding cell blank).

When the communication result of proxy transmission indicating that the transmission of the message failed is delivered from the receptor 12, the manager 14 returns the flag "under request" of the corresponding cell in the transmission management table 24 to "not completed" on the basis of the ship ID and the message ID Included in the communication result.

Furthermore, when the communication condition inquiry is delivered from the receptor 12, the manager 14 refers to the communication record table 22 and acquires communication conditions optimum for the inquiry. For example, when a communication record of communication performed in the same time slot with the ship 42 indicated by the ship ID included in the communication condition inquiry is stored in the communication record table 22, the manager 14 acquires communication conditions similar to those for the communication in the same time slot. In more detail, for example, the manager 14 specifies, from the communication record table 22, a communication record of which "base station ID" coincides with the base station ID of the base station 30 which is the transmission source of the communication condition inquiry and "transmission date and time" is included in a predetermined range with the time included in the communication condition inquiry as a reference. The manager 14 acquires communication conditions ("transfer speed" and "frequency") included in the specified communication record. When a plurality of communication records has been specified, the manager 14 acquires each of a plurality of communication conditions included in each of the plurality of communication records. Alternatively, the manager 14 may select and acquire, from among the specified communication records, a communication record of which "transmission date and time" is the latest or the reception position in the "communication status" field is nearest to the estimated position of the communication terminal 40 as the transmission destination of the message.

The estimated position of the ship 42 can be estimated, for example, from the route of the ship 42 obtained by placing the reception positions included in "communication status" of a communication record in the communication record table 22, of which the "ship ID" coincides with the ship ID of the ship 42 as the transmission destination, on a map in chronological order. When the ACK transmitted from the communication terminal 40 includes tidal current information, sea temperature information, and the like at the time of receiving the message at the communication terminal 40, these pieces of information may also be used for estimating the position of the communication terminal 40.

The manager 14 delivers the acquired communication conditions to the transmitter 16.

The transmitter 16 transmits the proxy transmission request delivered from the manager 14 to the base station 30 which is the transmission source of the communication result of the local device indicating that the transmission of the message was successful. The transmitter 16 also transmits the communication conditions delivered from the manager 14 to the base station 30 which is the transmission source of the communication condition inquiry.

Figure 6:
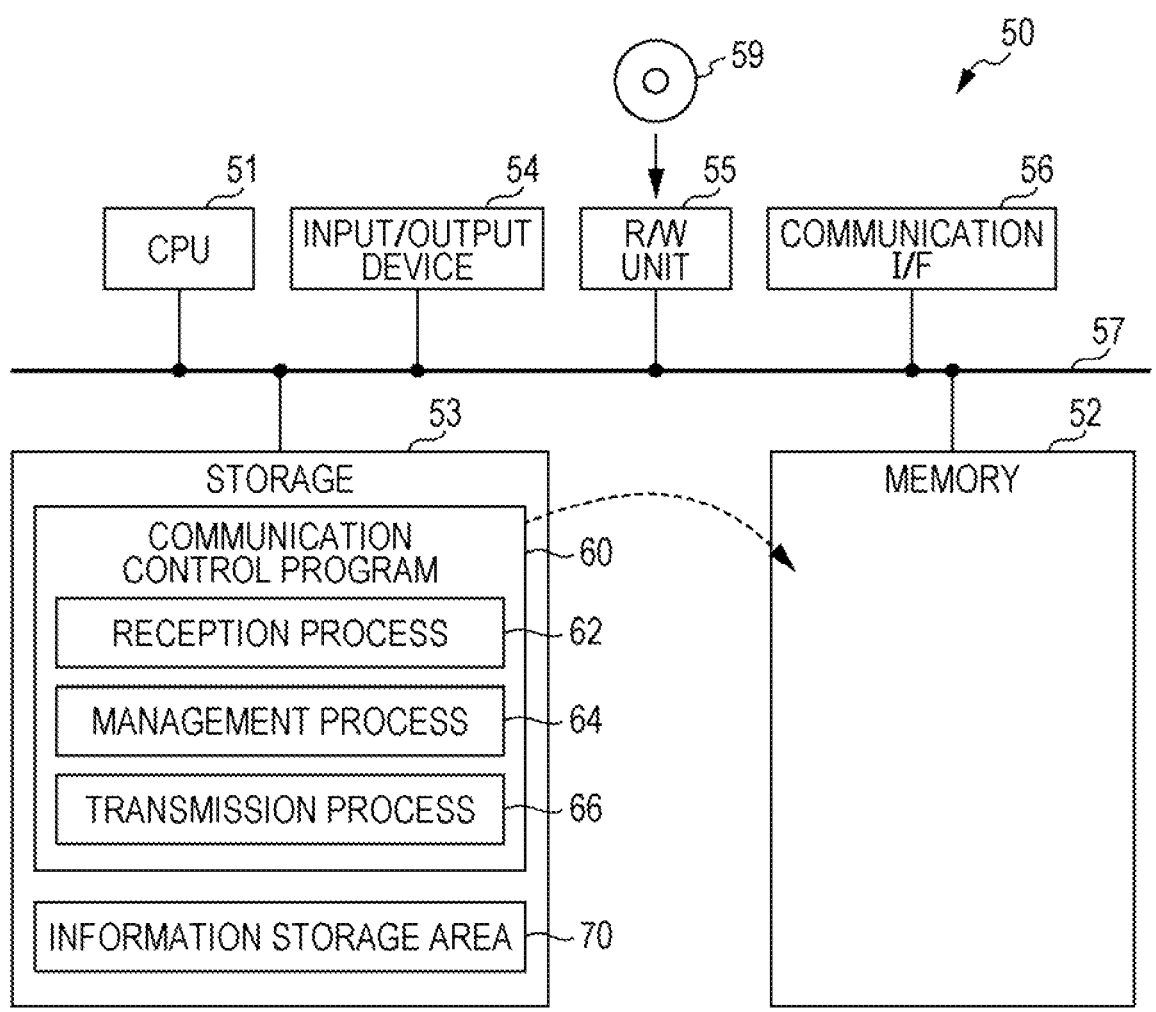
FIG. 6 is a block diagram illustrating a schematic configuration of a computer functioning as the communication control apparatus according to the present embodiment.

The communication control apparatus 10 can be implemented, for example, by a computer 50 illustrated in FIG. 6. The computer 50 includes a central processing unit (CPU) 51, a memory 52 as a temporary storage area, and a nonvolatile storage 53. The computer 50 also includes an input/output device 54, a read/write (R/W) unit 55 that controls reading and writing of data to and from a storage medium 59, and a communication interface (I/F) 56 connected to a network such as the Internet. The CPU 51, the memory 52, the storage 53, the input/output device 54, the R/W unit 55, and the communication I/F 56 are connected to each other via a bus 57.

The storage 53 can be implemented by a hard disk drive (HDD), a solid state drive (SSD), a flash memory, or the like. A communication control program 60 for causing the computer 50 to function as the communication control apparatus 10 is stored in the storage 53 as a storage medium. The communication control program 60 has a reception process 62, a management process 64, and a transmission process 66. The storage 53 has an information storage area 70 in which information constituting each of the communication record table 22, the transmission management table 24, and the message DB 26 is stored.

The CPU 51 reads out the communication control program 60 from the storage 53 to develop in the memory 52 and sequentially executes the processes included in the communication control program 60. The CPU 51 executes the reception process 62 to work as the receptor 12 illustrated in FIG. 2. The CPU 51 executes the management process 64 to work as the manager 14 illustrated in FIG. 2. The CPU 51 executes the transmission process 66 to work as the transmitter 16 illustrated in FIG. 2. The CPU 51 also reads out information from the information storage area 70 and develops each of the communication record table 22, the transmission management table 24, and the message DB 26 in the memory 52. With these procedures, the computer 50 executing the communication control program 60 functions as the communication control apparatus 10.

Functions implemented by the communication control program 60 can also be implemented, for example, by a semiconductor integrated circuit, in more detail, an application specific integrated circuit (ASIC) or the like.

Next, the action of the communication system 100 according to the present embodiment will be described.

Figure 7:
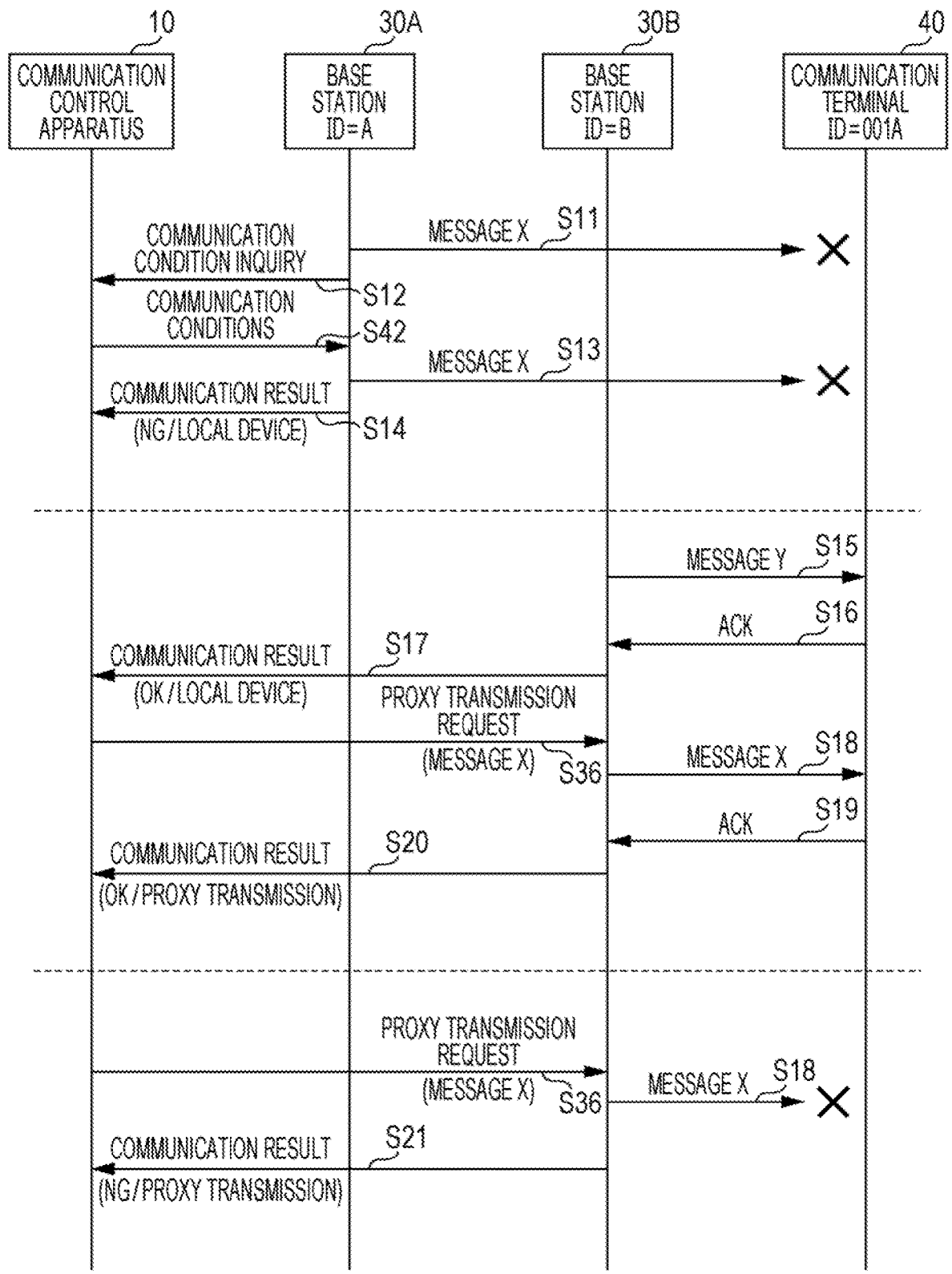
FIG. 7 is a sequence diagram illustrating exchange of information between the communication control apparatus, a base station, and a communication terminal.

First, the exchange of information between the communication control apparatus 10, the base station 30A with the base station ID=A, the base station 30B with the base station ID=B, and the communication terminal 40 carried on the ship 42 with the ship ID=001A will be described with reference to a sequence diagram illustrated in FIG. 7. The details of a communication control process executed by the communication control apparatus 10 will be explained precisely with reference to FIG. 8 described later.

First, the base station 30A transmits, to the communication terminal 40, a message with the message ID=X (hereinafter referred to as "message X") (S11). This example assumes that communication between the base station 30A and the communication terminal 40 is not established. In this case, the base station 30A does not receive the ACK from the communication terminal 40 even after the lapse of a predetermined time. Accordingly, the base station 30A transmits, to the communication control apparatus 10, the communication condition inquiry including the ship ID=001A, the base station ID=A, and Information on the scheduled transmission time of the message (S12).

The communication control apparatus 10 refers to the communication record table 22 to acquire communication conditions optimum for the received communication condition inquiry, and sends the acquired communication conditions to the base station 30A as a reply (S42).

The base station 30A modifies the communication conditions for transmitting the message X on the basis of the received communication conditions and resends the message X to the communication terminal 40 (S13). When the ACK is not received from the communication terminal 40 even by resending, the base station 30A repeats the communication condition inquiry to the communication control apparatus 10 until a termination condition is satisfied. The communication control apparatus 10 transmits, to the base station 30A, communication conditions different from the communication conditions transmitted last time. For one communication condition inquiry, a plurality of combinations of the communication conditions may be sent from the communication control apparatus 10 to the base station 30A as a reply. In this case, the base station 30A repeats resending of the message X to the communication terminal 40 while sequentially changing the combinations of the communication conditions one by one from among the plurality of received combinations of the communication conditions until the termination condition is satisfied.

The termination condition for repetition can be formed as a case where the number of times of resending of the message has reached a predetermined number of times or a case where all communication conditions that can be set in the base station 30 have been set.

This example assumes that communication between the base station 30A and the communication terminal 40 is not established even after the resending of the message X is repeated until the termination condition is satisfied. In this case, the base station 30A transmits, to the communication control apparatus 10, the communication result of the local device indicating that the transmission of the message failed, which includes a remark Indicating that this data is the communication result of the local device, the message ID=X, the ship ID=001A, and the message X to be transmitted (S14).

The communication control apparatus 10 stores the message X included in the received communication result in the message DB 26 and also stores the contents of the communication result in the transmission management table 24.

It is assumed that, after the above process is performed, a message with the message ID=Y (hereinafter referred to as "message Y") is transmitted from the base station 30B to the communication terminal 40 and communication is established (S15). In this case, the ACK Is sent from the communication terminal 40 to the base station 30B as a reply (S16). Then, the base station 30B transmits, to the communication control apparatus 10, the communication result of the local device indicating that the transmission of the message was successful, which includes a remark indicating that this data is the communication result of the local device, the message ID=Y, the communication conditions (transfer speed and frequency) at the time of transmitting the message Y, the base station ID=B, the transmission date and time of the message, the ship ID=001A, the communication status, and the like (S17).

The process of transmitting the message ID=Y from the base station 30B to the communication terminal 40 in S15 may be a process of transmitting some message from the communication terminal 40 to the base station 30.

The communication control apparatus 10 stores each piece of the information included in the received communication result in association with each item of the communication record table 22. In addition, the communication control apparatus 10 refers to the transmission management table 24 to specify that the transmission of the message X to the communication terminal 40 has not been completed, and transmits the proxy transmission request for the message X to the base station 30B (S36).

Upon receiving the proxy transmission request, the base station 30B transmits the message X to the communication terminal 40 (S18). This example assumes that the ACK is received from the communication terminal 40 (S19). In this case, the base station 30B transmits, to the communication control apparatus 10, the communication result of proxy transmission indicating that the transmission of the message was successful, which includes a remark indicating that this data is the communication result of proxy transmission, the message ID=X, and the ship ID=001A (S20). In addition, the base station 30B includes, into the communication result, the communication conditions (transfer speed and frequency) at the time of transmitting the message, the base station ID=B, the transmission date and time of the message, the communication status, and the like. Communication between the base station 30B and the communication terminal 40 has been built by the previous communication. Thus, the ionosphere is considered to have almost the same condition directly after the previous communication; accordingly, if communication for proxy transmission is formed again by the same communication method from the same base station, the probability of successful communication is high.

The communication control apparatus 10 stores the information included in the communication result in the communication record table 22 and at the same time updates the transmission management table 24.

On the other hand, when the transmission of the message X to the communication terminal 40 (S18) in response to the proxy transmission request (S36) failed, the base station 30B transmits, to the communication control apparatus 10, the communication result of proxy transmission indicating that the transmission of the message failed, which includes a remark indicating that this data is the communication result of proxy transmission, the message ID=X, and the ship ID=001A (S21). The communication control apparatus 10 updates the transmission management table 24 upon acceptance of this communication result.

Figure 8:
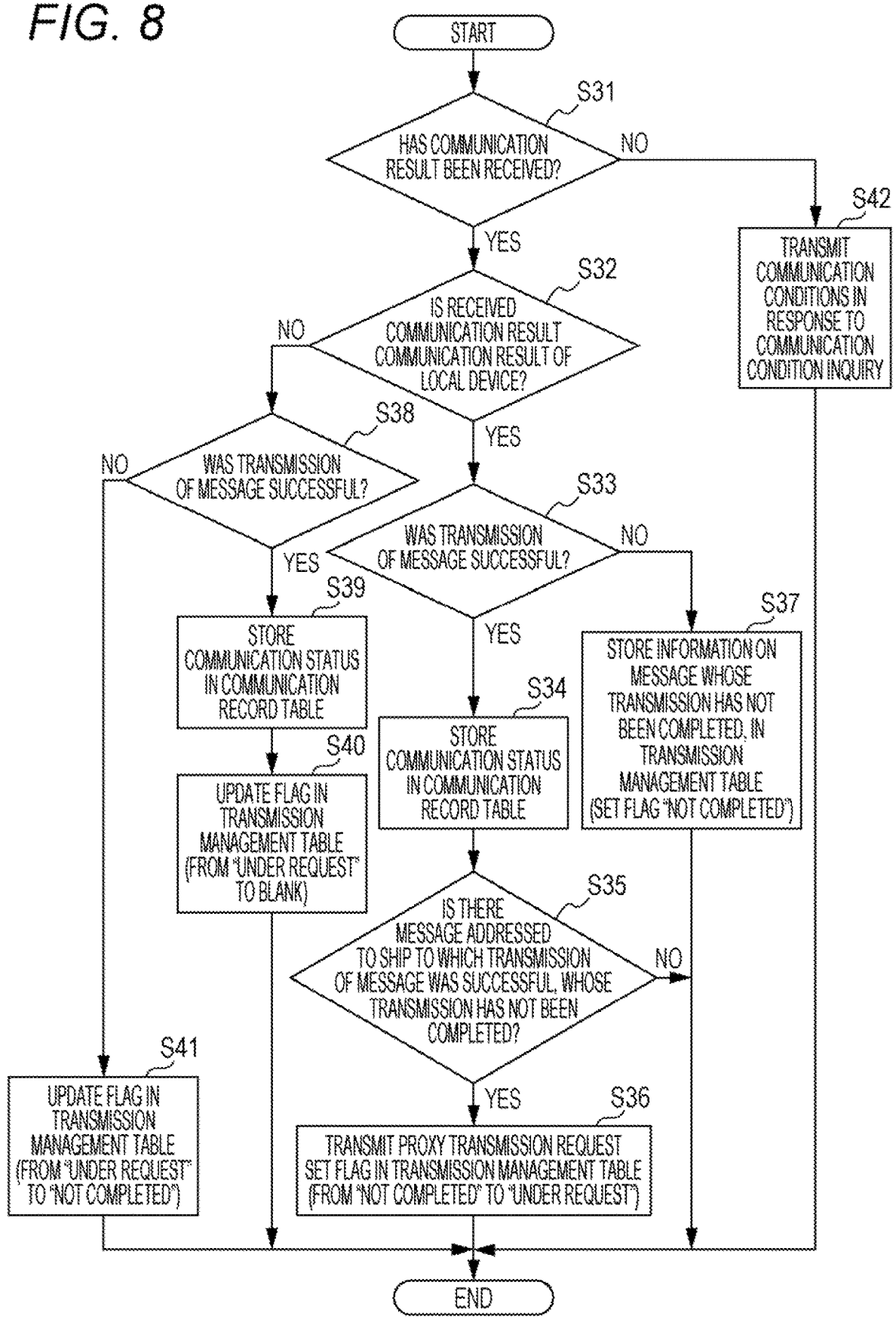
FIG. 8 is a flowchart illustrating an example of a communication control process.

Next, the communication control process executed by the communication control apparatus 10 will be described with reference to FIG. 8. The communication control process is executed in the communication control apparatus 10 when the communication control apparatus 10 receives the communication condition inquiry or the communication result from the base station 30. In the communication control process illustrated in FIG. 8, processes similar to those in the sequence diagram illustrated in FIG. 7 are denoted by the same reference numerals.

In step S31, the receptor 12 ascertains whether the communication result has been received from the base station 30. When the communication result has been received, the process proceeds to step S32.

In step S32, the receptor 12 delivers the communication result to the manager 14. The manager 14 ascertains whether the delivered communication result is the communication result of the local device. When the delivered communication result is the communication result of the local device, the process proceeds to step S33 and, when the delivered communication result is the communication result of proxy transmission, the process proceeds to step S38.

In step S33, the manager 14 ascertains whether the delivered communication result is the communication result indicating that the transmission of the message was successful. When the delivered communication result is the communication result Indicating that the transmission of the message was successful, the process proceeds to step S34 and, when the delivered communication result is the communication result indicating that the transmission of the message failed, the process proceeds to step S37.

In a case where the process proceeds to step S34, the delivered communication result is the communication result of the local device indicating that the transmission of the message was successful. Accordingly, the manager 14 stores each piece of information included in the communication result, such as the message ID, the communication conditions (transfer speed and frequency) at the time of transmitting the message, the base station ID, the transmission date and time of the message, the ship ID, and the communication status, in association with respective corresponding items of the communication record table 22.

Next, in step S35, the manager 14 refers to the transmission management table 24 to ascertain whether there is a message whose transmission to the communication terminal 40 carried on the ship 42 indicated by the ship ID included in the communication result delivered in step S32 above has not been completed. This ascertainment can be made by ascertaining whether there is a row in which the flag "not completed" is set in the column of the corresponding ship ID in the transmission management table 24. When there is a message whose transmission has not been completed, the process proceeds to step S36.

In step S36, the manager 14 specifies the message ID for which it is ascertained in step S35 above that there is a message whose transmission has not been completed. In the case of the example in FIG. 7, the manager 14 specifies the message ID=X corresponding to a row in which the flag "not completed" is set, from the column of the ship ID=001A in the transmission management table 24. Then, the manager 14 acquires the message X from the message DB 26 and delivers, to the transmitter 16, the proxy transmission request including the message X, and a request to transmit the message X to the communication terminal 40 carried on the ship 42 indicated by the ship ID=001A. The transmitter 16 transmits the proxy transmission request delivered from the manager 14 to the base station 30B. In addition, the manager 14 modifies the flag of the corresponding cell in the transmission management table 24, in this example, the cell corresponding to the message ID=X for the row and the ship ID=001A for the column, from "not completed" to "under request". Then, the communication control process is terminated.

On the other hand, when a negative ascertainment is made in step S35, step S36 is skipped and the communication control process is terminated.

Meanwhile, in a case where the process proceeds to step S37, the delivered communication result is the communication result of the local device indicating that the transmission of the message failed. Accordingly, the manager 14 stores the message included in the communication result in the message DB 26. In addition, the manager 14 adds the row of the message ID=X and the column of the ship ID=001A to the transmission management table 24 on the basis of the message ID=X and the ship ID=001A included in the communication result. Then, the manager 14 sets the flag "not completed" in the corresponding cell and the communication control process is terminated. When the corresponding row and column already exist in the transmission management table 24, it is only necessary to set the flag in the corresponding cell.

In step S38, the manager 14 ascertains whether the delivered communication result is the communication result indicating that the transmission of the message was successful. When the delivered communication result is the communication result indicating that the transmission of the message was successful, the process proceeds to step S39 and, when the delivered communication result is the communication result indicating that the transmission of the message failed, the process proceeds to step S41.

In a case where the process proceeds to step S39, the delivered communication result is the communication result of proxy transmission indicating that the transmission of the message was successful. Accordingly, the manager 14 stores information included in the communication result in the communication record table 22, as in step S34 above. Next, in step S40, the manager 14 cancels the setting of the flag "under request" of the cell in the row of the message ID=X and the column of the ship ID=001A in the transmission management table 24 on the basis of the message ID=X and the ship ID=001A included in the communication result (makes the cell blank). For example, a state indicating that the transmission of the message has been completed is represented. Then, the communication control process is terminated.

On the other hand, in a case where the process proceeds to step S41, the delivered communication result is the communication result of proxy transmission indicating that the transmission of the message failed. Accordingly, the manager 14 updates the flag of the cell in the row of the message ID=X and the column of the ship ID=001A in the transmission management table 24 from "under request" to "not completed" on the basis of the message ID=X and the ship ID=001A included in the communication result. For example, a state indicating that the transmission of the message has not yet been completed is represented. Then, the communication control process is terminated.

Furthermore, when it is ascertained in step S31 above that the communication condition inquiry has been received from the base station 30, the process proceeds to step S42. In step S42, the receptor 12 delivers the communication condition inquiry to the manager 14. The manager 14 then acquires communication conditions optimum for the communication condition inquiry from the communication record table 22 on the basis of the ship ID, the base station ID, and information on the scheduled transmission time included in the communication condition inquiry. The manager 14 delivers the acquired communication conditions to the transmitter 16. The transmitter 16 transmits the communication conditions delivered from the manager 14 to the base station 30, which is the transmission source of the communication condition inquiry, and the communication control process is terminated.

As described thus far, according to the communication control apparatus of the present embodiment, the communication result for the communication terminal is received from each base station, and the recording of the communication that failed in transmission of the message is managed. Then, on the basis of the recording of the failed communication, the base station that was successful in transmission of the message is caused to transmit the message addressed to the corresponding communication terminal, by proxy. With these procedures, the reliability of information transmission to the mobile body carrying the communication terminal is suitably improved.

Note that, in the above embodiment, when the transmission management table 24 is referred to and a message for which proxy transmission is to be requested is specified, in a case where there is a plurality of applicable messages, the proxy transmission request for a message with a higher priority may be made earlier on the basis of the priority according to the content of the message.

For example, higher priority is set for communication such as urgent communication relating to distress or the like, and alarm or warning informing that there is a possibility that a ship will be at risk. Following these communications, area information on drift objects, shooting training, or the like, and important communications, for example, about turning off the lighthouse are set to medium priority. Communication for periodically acquiring position information, notification of safety confirmation, and the like are set with low priority depending on conditions. Then, when the transmission of the message failed, as in the transmission management table 24 illustrated in FIG. 9 as an example, the flag "not completed" is set and at the same time the priority of the failed message is also stored in the transmission management table 24. The priority of the message may be stored in the header section of the message, or the manager 14 may find out the priority in accordance with the message type in the header section of the message. Then, for example, in the example in FIG. 9, when there is a base station 30 that was successful in transmitting the message to the communication terminal 40 carried on the ship 42 indicated by the ship ID=001A, initially, the proxy transmission request for a message with the message ID=A03 with a higher priority is made first. With this procedure, even when the transmission of an important and urgent message has failed, such a message may be preferentially transmitted.

In the above embodiment, communication between the communication terminal carried on the ship moving on the sea and the base station has been described as an example, but the present invention is not limited to this embodiment. The disclosed technology can also be applied to communication between a mobile body such as an airplane traveling in the sky and the base station, and communication between a communication terminal present on the ground such as mountains, deserts, or wide factories and the base station.

In the above embodiment, a case where the communication between the communication terminal and the base station is communication using the shortwave frequency has been described as an example, but the communication technique is not particularly limited. However, in the case of a communication technique utilizing the ionospheric reflection, the application effect of the disclosed technology increases.

In the above description, a mode in which the communication control program 60, which is an example of the program according to the disclosed technology, is stored (installed) in advance in the storage 53 has been described, but the present invention is not limited to this mode. The program according to the disclosed technology can also be provided in a form stored in a storage medium such as a compact disc read only memory (CD-ROM), a digital versatile disc read only memory (DVD-ROM), or a universal serial bus (USB) memory.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the Invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a communication control program for causing a computer to execute a process comprising:
   receiving, from a first base station included in a plurality of base stations, first communication result indicating that transmission of a message from the first base station to a first communication terminal is failed;
   storing, based on the received first communication result, the message in a storage in association with identification information on the first communication terminal;
   referring, when receiving, from a second base station included in the plurality of base stations, second communication result indicating that communication is established between the second base station and a second communication terminal, to the storage; and
   transmitting, when identification information of the second communication terminal matches the identification information of the first communication terminal, the message stored in association with the identification information of the first communication terminal to the second base station, and requesting the second base station to transmit the message to the second communication terminal.

2. The non-transitory computer-readable recording medium according to claim 1, wherein communication between the base stations and the first and second communication terminals is communication utilizing a shortwave frequency zone.

3. The non-transitory computer-readable recording medium according to claim 1, wherein the message in association with the identification information on the first communication terminal is stored in association with a priority defined in advance according to content of the message, and when the second base station is requested to transmit the message to the second communication terminal, a request is made earlier for a message with a higher level of the priority in descending order of the priority.

4. The non-transitory computer-readable recording medium according to claim 1, wherein the second communication result includes information on a communication condition at a time of establishment of the communication, and when receiving the second communication result, the communication condition included in the received second communication result is stored in the storage in a state in which each of the plurality of base stations is allowed to refer to the communication condition.

5. A communication control apparatus comprising:
   a memory; and
   a processor coupled to the memory and configured to:
      receive, from a first base station included in a plurality of base stations, first communication result indicating that transmission of a message from the first base station to a first communication terminal is failed; and
      store, based on the received first communication result, the message in the memory in association with identification information on the first communication terminal;
      refer to, when receiving, from a second base station included in the plurality of base stations, second communication result indicating that communication is established between the second base station and a second communication terminal, the memory;

read out the message stored in association with the identification information on the first communication terminal;

transmit, when identification information of the second communication terminal matches the identification information of the first communication terminal, the read-out message to the second base station; and transmit an instruction to the second base station to request transmission of the message to the second communication terminal.

6. The communication control apparatus according to claim 5, wherein communication between the base stations and the first and second communication terminals is communication utilizing a shortwave frequency zone.

7. The communication control apparatus according to claim 5, wherein the processor stores the message in association with the identification information on the first communication terminal, in association with a priority defined in advance according to content of the message, and, when requesting the second base station to transmit the message to the second communication terminal, makes a request earlier for a message with a higher level of the priority in descending order of the priority.

8. The communication control apparatus according to claim 5, wherein the second communication result includes information on a communication condition at a time of establishment of the communication, and when receiving the second, the manager stores the communication condition included in the received second communication result in the memory in a state in which each of the plurality of base stations is allowed to refer to the communication condition.

9. A communication control method comprising:

receiving, from a first base station included in a plurality of base stations, first communication result indicating that transmission of a message from the first base station to a first communication terminal is failed;

storing, by a computer, based on the received first communication result, the message in a storage in association with identification information on the first communication terminal;

referring, when receiving, from a second base station included in the plurality of base stations, second communication result indicating that communication is established between the second base station and a second communication terminal, to the storage;

transmitting, when identification information of the second communication terminal matches the identification information of the first communication terminal, the message stored in association with the identification information of the first communication terminal to the second base station; and requesting the second base station to transmit the message to the second communication terminal.

10. The communication control method according to claim 9, wherein communication between the base stations and the first and second communication terminals is communication utilizing a shortwave frequency zone.

11. The communication control method according to claim 9, wherein the message in association with the identification information on the first communication terminal is stored in association with a priority defined in advance according to content of the message, and when the second base station is requested to transmit the message to the second communication terminal, a request is made earlier for a message with a higher level of the priority in descending order of the priority.

12. The communication control method according to claim 9, wherein the second communication result includes information on a communication condition at a time of establishment of the communication, and when receiving the second, the communication condition included in the received second communication result is stored in the storage in a state in which each of the plurality of base stations is allowed to refer to the communication condition.

* * * * *